May 29, 1923.
J. J. PEAHOTZKI
CORN MIXER AND SILK REMOVER
Filed Sept. 25, 1922
1,456,826
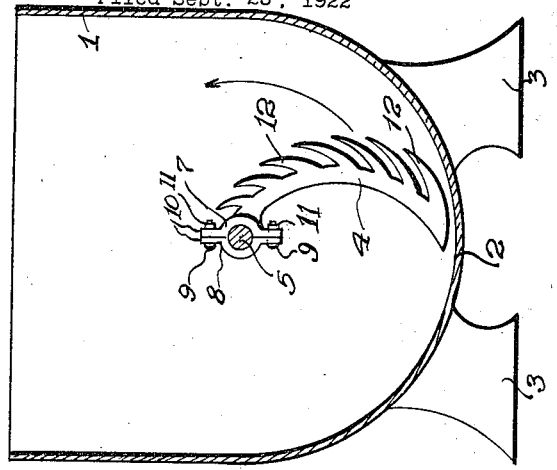
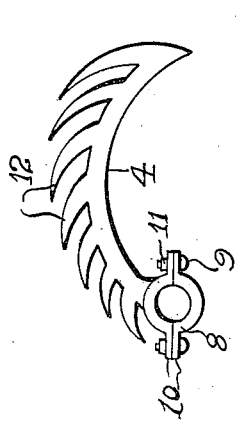
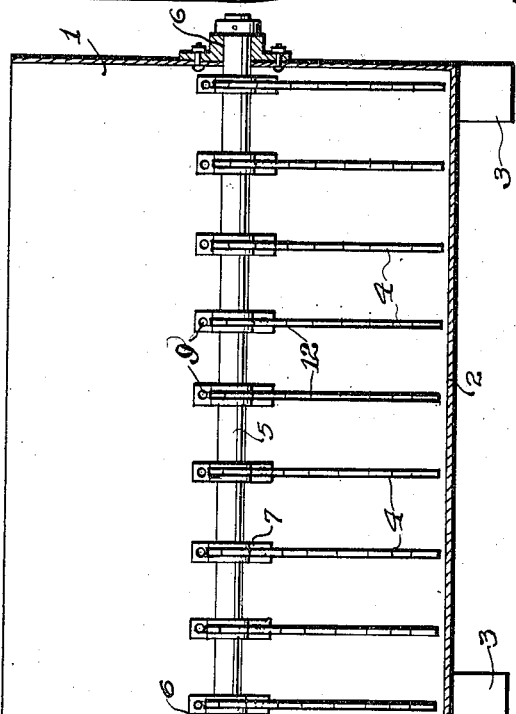
Inventor
John J. Peahotzki
By Blackwood Bros.
Attorneys Patented May 29, 1923.

1,456,826

UNITED STATES PATENT OFFICE.

JOHN J. PEAHOTZKI, OF BALTIMORE, MARYLAND.

CORN MIXER AND SILK REMOVER.

Application filed September 25, 1922. Serial No. 590,376.

*To all whom it may concern:*

Be it known that I, JOHN J. PEAHOTZKI, residing at Baltimore city, in the State of Maryland, a citizen of the United States, have invented certain new and useful Improvements in Corn Mixers and Silk Removers; and I do hereby declare the following to be a full, clear, and exact description of the invention, such as will enable others skilled in the art to which it pertains to make and use the same.

My invention relates to corn mixers and silk removers.

In preparing corn for canning, it is cut from cobs, chopped or grated and mixed with a syrup, generally consisting of sugar, salt and water and although, before mixing it with the syrup, care is taken to remove the silk it is next to impossible, by hand, to remove it all consequently silk remains in the mixture.

It is the object of my invention primarily, to provide means which will absolutely insure the removal of all the silk from the mixture.

It is a further object, simultaneously with the removal of the silk from the mixture, to insure a thorough mixture of the corn with the syrup.

It is a further object to bring the silk, as it is withdrawn from the mixture, within easy reach so that it can be readily removed by hand or otherwise.

It is a still further object to provide means, for effectively accomplishing the before mentioned objects, which is simple, inexpensive and durable in construction and which will remove all the silk and mix the corn and syrup thoroughly in the minimum length of time and with the minimum degree of labor.

My invention consists in providing a series of arms adapted to be rotatably mounted within a receptacle, in which corn and syrup are to be placed and mixed, said arms being curved and having curved tapering fingers of graduated length from end to end of the arms and adapted, when rotated, to alternately enter the mixture and rise therefrom passing through every portion thereof, thereby thoroughly mixing said corn and syrup and simultaneously, by means of their fingers removing all the silk therefrom, thus preparing the mixture for canning, without any silk therein.

In the drawings illustrating my invention,

Figure 1 is a longitudinal vertical sectional view of my corn mixer and silk remover.

Figure 2 a transverse vertical sectional view thereof, and

Figure 3 a side view, on an enlarged scale to that of the other views, of one of my corn mixing and silk removing arms.

Referring, in detail, to the drawings in which like reference characters designate corresponding parts throughout the several views, 1 designates the receptacle into which the corn and syrup are placed, after the corn has been chopped or grated and the syrup added. The lower half 2 of this receptacle is semi-cylindrical in a tranverse direction, for a purpose to be hereinafter explained, and the receptacle is supported on legs 3.

4 designates my combined corn mixing and silk removing arms, hereinafter specifically described, each of which is secured to a shaft 5, rotatably journalled at its ends in bearings 6 secured to the receptacle, by means of clamps each comprising a section 7 integral with an arm 4, which it carries, and a section 8, said sections being secured together and clamped to the shaft 5 by means of headed threaded bolts 9 passing through laterally projecting ends 10 of the sections and having nuts 11 thereon.

Each arm 4 is curved in the direction of its length and provided with laterally extending curved tapering overlapping fingers 12, said fingers graduating in length from the outer ends of the arms at which the longest fingers are located to their inner ends at which the shortest fingers are located.

By reason of these arms 4 being secured to the shaft 5, when said shaft is rotated, the fingers being of different lengths each finger describes a different circle in passing through the contents of the receptacle, and by reason of the lower half of the receptacle being semi-circular, in a transverse direction, the fingers 12 on the outer ends of the arms move in close proximity to the wall of the receptacle and as the other fingers 12 are spaced only a short distance apart and extend to the inner ends of the arms, said arms and fingers thereon pass through every part of the contents of the receptacle and thoroughly mix said contents and also by reason of the fingers being curved and tapering their ends easily and readily pick up the corn silk as the arms and said fingers pass through the contents of the receptacle and it is forced inwardly between said fingers as they pick up more corn silk.

The arms 4, in their rotary movement, after passing down through the contents of the receptacle rise therefrom above the level of said contents, whereupon the corn silk is removed from the fingers by hand or in any other convenient manner.

To afford means for rotating the shaft 5 to cause the arms and fingers thereon to enter the contents of the receptacle and thoroughly mix said contents and interrupt the rotary movement of said shaft when the arms are out of the contents of the receptacle so that the corn silk can be easily and readily removed from the fingers of said arms, a sprocket wheel 13 is rotatably mounted on the shaft 5 and adapted to be rotated therewith when the teeth 14 provided on its outer face engage teeth 15 provided on the inner face of the sleeve 16, which sleeve is slidably held on the shaft 5 by a spline 17 on said shaft engaging a groove 18 in the sleeve and said sprocket wheel acts as an idler and turns on the shaft 5 when its teeth 14 are out of engagement with the teeth 15 of the sleeve.

The sleeve 16 is rotatably mounted in a hand lever 19 the lower end of which is pivoted at 20 to a bracket 21 secured on the receptacle, from which construction it will be seen that when the lever 19 is moved inwardly the sleeve 16 will also be moved inwardly and its teeth 15 will engage the teeth 14 of the sprocket wheel 13 causing the sprocket wheel to rotate the shaft 5 and the arms 4 thereon and when the lever 19 is moved outwardly the sleeve 16 will also be moved outwardly disengaging its teeth 15 from the teeth 14 of the sprocket wheel 13 which will then be loose on the shaft 5 and cease to rotate said shaft.

The sprocket wheel 13 is rotated by any convenient or suitable means, not shown, but may consist of a chain running over the sprocket wheel 13 and over a sprocket wheel on the drive shaft of a steam engine or motor.

I do not wish to be understood as limiting myself to the specific details of construction and arrangement as herein described and as illustrated in the drawings, as it is manifest that variations and modifications may be made in the features of construction and arrangement, in the adaptation of the device to the various conditions of use, without departing from the spirit and scope of my invention and improvements.

What I claim is:—

1. In a corn mixer and silk remover, a receptacle adapted to contain a mass of material to be mixed and arms rotatably mounted therein having fingers to enter and stir the mixture and rise therefrom to thereby lift the silk from the mass.

2. In a corn mixer and silk remover, a receptacle adapted to contain a mass of material to be mixed and arms rotatably mounted therein having curved fingers to enter and stir the mixture and rise therefrom to thereby lift the silk from the mass.

3. In a corn mixer and silk remover, a receptacle adapted to contain a mass of material to be mixed and arms rotatably mounted therein having fingers graduated in length to enter and stir the mixture and rise therefrom to thereby lift the silk from the mass.

4. In a corn mixer and silk remover, a receptacle adapted to contain a mass of material to be mixed and arms rotatably mounted therein having curved fingers graduated in length to enter and stir the mixture and rise therefrom to thereby lift the silk from the mass.

In testimony whereof I have affixed my signature.

JOHN J. PEAHOTZKI.